United States Patent
Park et al.

(10) Patent No.: US 9,432,932 B2
(45) Date of Patent: Aug. 30, 2016

(54) METHOD AND APPARATUS FOR CONTROLLING SIGNAL TRANSMISSION OF WIRELESS COMMUNICATION SYSTEM

(71) Applicant: ELECTRONICS AND TELECOMMUNICATIONS RESEARCH INSTITUTE, Daejeon (KR)

(72) Inventors: Jisoo Park, Daejeon (KR); Young-il Kim, Daejeon (KR); Won Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 125 days.

(21) Appl. No.: 14/036,345

(22) Filed: Sep. 25, 2013

(65) Prior Publication Data

US 2014/0086126 A1    Mar. 27, 2014

(30) Foreign Application Priority Data

Sep. 27, 2012  (KR) .................. 10-2012-0107662
Jul. 11, 2013  (KR) .................. 10-2013-0081831

(51) Int. Cl.
*G08C 17/00*  (2006.01)
*H04W 52/02*  (2009.01)

(52) U.S. Cl.
CPC ................. *H04W 52/0206* (2013.01)

(58) Field of Classification Search
CPC ........................................ H04W 52/02
USPC .......................................... 370/311
See application file for complete search history.

(56) References Cited

U.S. PATENT DOCUMENTS

| | | | |
|---|---|---|---|
| 2009/0180414 A1* | 7/2009 | Maeda et al. | 370/311 |
| 2009/0201838 A1* | 8/2009 | Zhang et al. | 370/280 |
| 2011/0026642 A1* | 2/2011 | Kawamura et al. | 375/316 |
| 2012/0014361 A1* | 1/2012 | Jung et al. | 370/338 |
| 2012/0157002 A1 | 6/2012 | Choi | |
| 2012/0157153 A1 | 6/2012 | Song | |

FOREIGN PATENT DOCUMENTS

| | | |
|---|---|---|
| KR | 10-2012-0067856 A | 6/2012 |
| KR | 10-2012-0070385 A | 6/2012 |

* cited by examiner

*Primary Examiner* — Christopher R Crompton

(57) ABSTRACT

A base station broadcasts information of an entire discontinuous signal transmission duration and information of a discontinuous signal transmission interval to a plurality of terminals, and stops transmission of a downlink control signal and data for at least some interval of the discontinuous signal transmission interval.

17 Claims, 13 Drawing Sheets

METHOD AND APPARATUS FOR CONTROLLING SIGNAL TRANSMISSION OF WIRELESS COMMUNICATION SYSTEM

CROSS-REFERENCE TO RELATED APPLICATION

This application claims priority to and the benefit of Korean Patent Application Nos. 10-2012-0107662 and 10-2013-0081831 filed in the Korean Intellectual Property Office on Sep. 27, 2012 and Jul. 11, 2013, the entire contents of which are incorporated herein by reference.

BACKGROUND (a) Field

The present invention relates to a method and apparatus for controlling signal transmission of a wireless communication system. More particularly, the present invention relates to a method and apparatus for controlling signal transmission that can save power and reduce interference in a wireless communication system.

(b) Description of the Related Art

In order to increase capacity of a network, by overlappingly disposing cells of different sizes using the same frequency band such as a low power small remote radio head (RRH) cell, a pico cell, a relay, and a femto cell, heterogeneous network technology for enlarging a cell capacity per unit area and for improving QoS of a terminal that is positioned at a cell boundary area is emerging, along with a wireless communication system and a wireless access service network for continuity of a multimedia service.

In order to enlarge mobile traffic capacity of a network in addition to a macro cell base station, at a home, a school, a company, and a hot spot region, a base station of a small-sized cell such as a pico cell and a femto cell is installed, cell coverage for securing reliability and enhancing performance of wireless communication in a railroad and an express highway is extended, an additional base station for guaranteeing mobility is installed, and in order to solve a weak radio area, a relay is installed.

However, there is a drawback that enlargement of various types of base stations corresponding to the number of cells that is increased with enlargement of capacity of a network for satisfying an explosively increasing wireless data service increases interference between cells as well as power consumption.

At a time zone and location where a communication amount of an actual user is high, user traffic is concentrated. At a company, a school, or a home, due to a user's movement, user traffic may be concentrated, very little traffic may occur, or traffic may not occur, and at a park or a leisure life region, concentration, absence, and distribution of traffic may occur according to a user moving time. In this way, a situation in which mobile traffic does not occur or in which a consumption amount of mobile traffic is much less may sequentially frequently occur.

However, a base station of an existing wireless communication system always periodically transmits a control signal regardless of whether a terminal is connected, a state of a connected terminal, or a demand amount of user traffic, a terminal acquires synchronization or system information such as a preamble, a common pilot, a beacon signal, and a reference signal for measuring a quality state of a wireless signal of a downlink, and a downlink control channel signal for acquiring system information and information of a corresponding transmitting frame or subframe correspond to the control signal. Thereby, even when a terminal that is connected to the base station does not exist or is in an idle state, or even when mobile traffic does not exist or even when a demand amount of mobile traffic is small, a reference signal of a downlink control channel signal and a pilot signal has periodicity, and as the reference signal is continuously transmitted by a base station without distinction, there is a drawback that power consumption of a base station continuously occurs.

Even if traffic to transmit to a downlink does not exist for a predetermined time regardless of whether a terminal that is connected to the base station exists or a service connection state, in order to transmit such a control signal from the base station to a downlink, for operation of a modulation apparatus of a physical (PHY) layer using a modulation method such as a medium access control (MAC) layer and orthogonal frequency division multiple access (OFDMA), power is requested and power of an RF apparatus for transmitting by wireless is always necessary. Further, transmission of such a control signal may interfere with an adjacent cell.

Therefore, in the wireless communication system, for a wireless frame interval in which transmission of a reference signal such as a downlink control channel signal and a pilot signal is continued, by controlling transmission of a wireless signal as needed, unnecessary power consumption is reduced, and by reducing interference between neighboring or overlapped base stations, it is necessary to reduce transmission power of a neighboring base station such as that caused by unnecessary retransmission.

SUMMARY

The present invention has been made in an effort to provide a method and apparatus for controlling signal transmission of a wireless communication system having advantages of saving power in the wireless communication system and reducing interference between neighboring base stations.

An exemplary embodiment of the present invention provides a method of controlling signal transmission in a base station. The method includes: broadcasting information of an entire discontinuous signal transmission duration and information of a discontinuous signal transmission interval; and stopping transmission of a downlink control signal and data for at least some interval of the discontinuous signal transmission interval.

The method may further include determining the entire discontinuous signal transmission duration and the discontinuous signal transmission interval.

The broadcasting of information may include broadcasting a system information message including the information of the entire discontinuous signal transmission duration and the information of the discontinuous signal transmission interval.

The system information message may be transmitted with a cycle longer than a superframe cycle.

The broadcasting of information may include broadcasting a downlink control channel signal including the information of the entire discontinuous signal transmission duration and the information of the discontinuous signal transmission interval.

The downlink control channel signal may be transmitted in every frame.

The frame may include a plurality of downlink subframes, and the downlink control channel signal may be transmitted at a downlink subframe that is not included in the discontinuous signal transmission interval among the plurality of downlink subframes.

The method may further include transmitting a preamble signal at a downlink preamble interval of the discontinuous signal transmission interval.

The method may further include transmitting a system information message at a system information transmission interval of the discontinuous signal transmission interval.

The stopping of transmission may include stopping transmission of the remaining entire downlink control signal and data, except for a preamble signal and a system information message, at the discontinuous signal transmission interval.

The method may further include receiving information of an entire discontinuous signal transmission duration and information of a discontinuous signal transmission interval from a discontinuous signal transmission connection network control apparatus.

The stopping of transmission may include intercepting power of a transmitting apparatus.

Another embodiment of the present invention provides a signal transmission control apparatus of a base station. The signal transmission control apparatus includes a transmitter and a transmission controller. The transmitter broadcasts information of an entire discontinuous signal transmission duration and information of a discontinuous signal transmission interval to which zero energy is allocated. The transmission controller controls signal transmission at the discontinuous signal transmission interval.

The transmission controller may stop signal transmission for at least some intervals of the discontinuous signal transmission intervals.

The transmission controller may stop the signal transmission for the remaining intervals, except for a downlink preamble interval and a system information transmission interval, of the discontinuous signal transmission interval.

The transmitter may transmit a system information message that is transmitted with a cycle longer than a superframe cycle, and the system information message may include information of the entire discontinuous signal transmission duration and information of the discontinuous signal transmission interval.

The transmitter may transmit a downlink control channel signal in every frame, and the downlink control channel signal may include information of the entire discontinuous signal transmission duration and information of the discontinuous signal transmission interval.

The downlink control channel signal may be transmitted at a interval that is not set as the discontinuous signal transmission interval in the frame.

The signal transmission control apparatus may further include a discontinuous signal transmission determiner. The discontinuous signal transmission determiner may determine information of the entire discontinuous signal transmission duration and the discontinuous signal transmission interval.

The signal transmission control apparatus may further include a receiver. The receiver may receive information of the entire discontinuous signal transmission duration and information of the discontinuous signal transmission interval from a discontinuous signal transmission connection network control apparatus.

DETAILED DESCRIPTION

Figure 1:
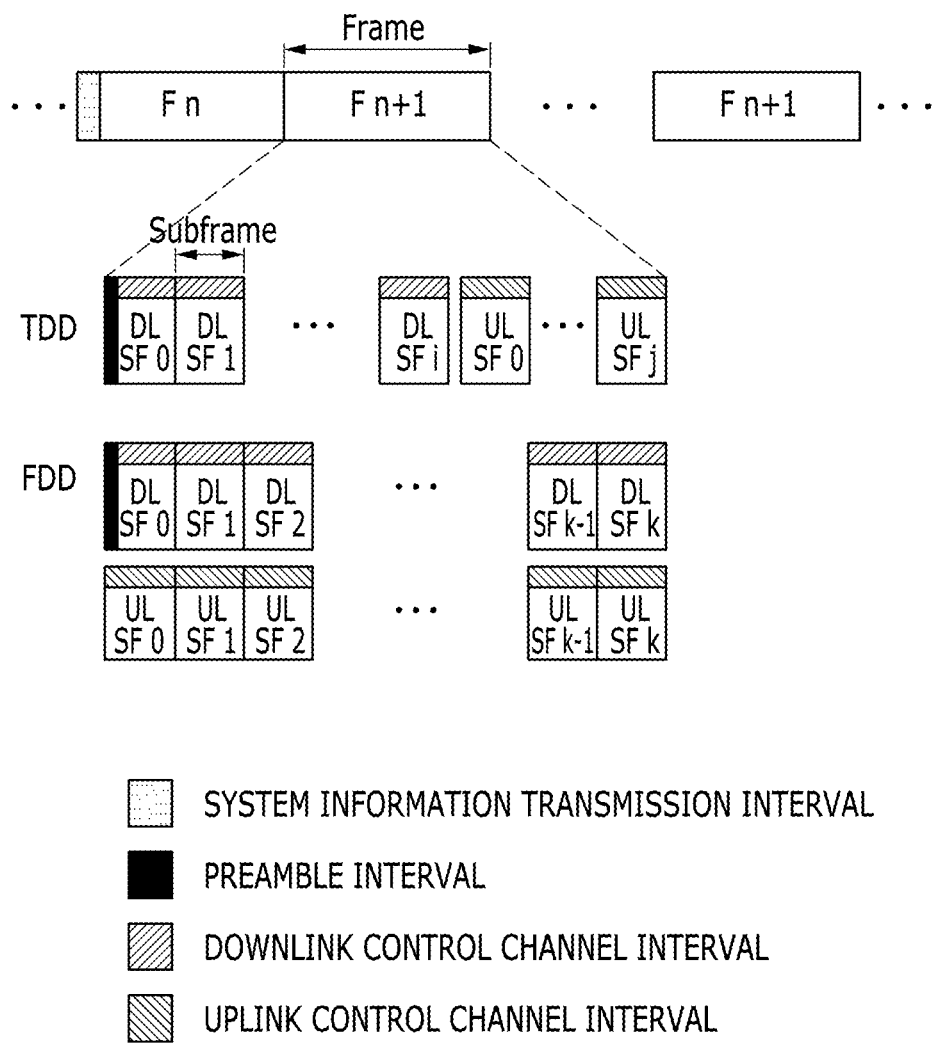
FIG. 1 is a diagram illustrating an example of a frame structure of a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

In the entire specification, a terminal may indicate a mobile station (MS), a mobile terminal (MT), an advanced mobile station (AMS), a high reliability mobile station (HR-MS), a subscriber station (SS), a portable subscriber station (PSS), an access terminal (AT), and user equipment (UE) and may include an entire function or a partial function of the terminal, the MT, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a function of the BS, and a high reliability relay station (HR-RS) that performs a function of the BS, and may include an entire function or a partial function of the ABS, the nodeB, the eNodeB, the AP, the RAS, the BTS, the MMR-BS, the RS, and the HR-RS.

Further, the base station may indicate a base station such as a macro cell, a remote wireless cell, a pico cell, a micro cell, and a femto cell according to formation of a cell, and may include a partial function or an entire function thereof.

In the specification, an exemplary embodiment of the present invention is described using a wireless broadband (WiBro) system of IEEE802.16e based on IEEE802.16 and a WirelessMAN-Advanced (or WiBro-Advanced, WiMAX-Advanced) system using IEEE802.16m (IEEE802.16.1) as a technical specification, but this is an illustration, and an exemplary embodiment of the present invention can be applied to any communication system such as LTE and LTE-Advanced.

Hereinafter, a method and apparatus for controlling signal transmission of a wireless communication system according to an exemplary embodiment of the present invention will be described in detail with reference to the drawings.

FIG. 1 is a diagram illustrating an example of a frame structure of a wireless communication system according to an exemplary embodiment of the present invention.

Referring to FIG. 1, in an FDD mode, data is transmitted and received through a downlink band and an uplink band corresponding thereto.

In this way, in the FDD mode, uplink transmission and downlink transmission are divided by frequency, and each frame of the FDD mode includes only one of a downlink subframe or an uplink subframe in a specific frequency band. That is, in a downlink band, each frame may include a (k+1) number of downlink subframes (DL SF0-DL SFk), and in an uplink band, each frame may include a (k+1) number of uplink subframes (UL SF0-UL SFk). (K+1) corresponds to the number of subframes constituting one frame.

In a TDD mode, a frame is divided into an uplink time unit and a downlink time unit in a time domain, and data is transmitted and received through the uplink/downlink time unit.

In this way, in the TDD mode, because uplink transmission and downlink transmission are divided by time, in a specific frequency band, each frame of the TDD mode includes the (i+1) number of downlink subframes (DL SF0-DL SFi) and the (j+1) number of uplink subframes (UL SF0-UL SFj). In this case, the numbers i and j may be the same or different.

A superframe may be formed by combining a plurality of frames. For example, a superframe may include 4 frames.

In the FDD mode and the TDD mode, each frame includes a downlink preamble interval for acquiring synchronization and cell information. At the downlink preamble interval, a reference signal such as a downlink preamble signal and a pilot signal is transmitted.

The receiving side finds state information of a radio channel and corrects distortion corresponding to channel information in a received signal, thereby receiving an accurate signal. In order to find channel information, the transmission side transmits a signal that both the transmission side and the receiving side know, and the receiving side finds state information of a channel using a distortion degree of the signal when the signal is received through a channel. In this case, a signal that both the transmission side and the receiving side know is referred to as a reference signal.

The pilot signal is fixed and transmitted in a constant pattern according to the antenna number within a downlink subframe regardless of a control channel interval and a data allocation interval. At the control channel interval, the control channel is allocated to a resource to which a pilot signal is not allocated, and traffic data is allocated to a resource to which a pilot signal is not allocated in a data area.

A system information transmission interval exists in every scheduled cycle, and at the system information transmission interval, system information is transmitted by a base station. The base station broadcasts a system information message so that all terminals that are connected to a subordinate base station receive the system information message in a frame or a subframe with a scheduled cycle. The system information message includes a system parameter and system configuration information of a base station, and may be divided and transferred into several types according to a kind of a message. Further, the system information message has periodicity, has a predictable transmission cycle so that all terminals may receive the system information message, and a system information message of the same type or different types is broadcasted at a plurality of frames with a constant cycle according to a purpose.

Further, in the FDD mode and the TDD mode, downlink subframes (DL SF0-DL SFk, DL SF0-DL SFi) of each frame include a downlink control channel interval including configuration information of a downlink resource, and uplink subframes (UL SF0-UL SFk, UL SF0-UL SFj) include a uplink control channel interval including configuration information of a uplink resource. At the downlink control channel interval, a downlink control channel signal such as a common or unicast control channel signal is transmitted, and at the uplink control channel interval, an uplink control channel signal such as a common or unicast control channel signal is transmitted.

The downlink control channel signal is a signal that both the transmitting side and the receiving side know like a system information message, and the downlink control channel includes a common or non-user specific control channel that is commonly provided to all terminals and a unicast control channel that is provided to a specific terminal. In order to acquire unicast channel information, the common control channel is allocated in every frame or subframe regardless of whether a unicast channel exists. That is, the downlink common control channel is an indicator channel that provides the number of unicast control channels and transmits information of a resource allocation control channel of a downlink or a uplink to a terminal in every frame or subframe, and the terminal may analogize configuration information of a radio resource corresponding to a resource allocation control channel through the information.

The unicast control channel includes a resource allocation channel that provides the number of wireless resources, a length and a location of a resource block, multiple-input multiple-output (MIMO) for multiple transmission and reception, or hybrid automatic repeat and request (HARQ) information to a specific terminal and a control channel that provides feedback information, which is a HARQ indicator of uplink receiving traffic, and only when it is necessary to transfer corresponding information to a specific terminal or a specific terminal group does the unicast control channel transmit the corresponding information to a downlink.

In a wireless communication system, even if traffic to transmit to a downlink does not exist for a predetermined time regardless of whether a terminal that is connected to the base station exists or regardless of a connection state such as an idle state and a sleep mode state of the terminal, a downlink common control channel signal and a pilot signal are transmitted in every frame or subframe, and a preamble signal for acquiring synchronization is transmitted to the downlink in every frame. Therefore, even when a connected terminal does not exist, is in an idle state, or traffic to transmit does not exist, as the base station transmits the downlink control signal and the common pilot signal, unnecessary power consumption continuously occurs in every frame or subframe.

Hereinafter, a method of controlling signal transmission that can reduce power consumption according to a downlink control signal will be described.

Figure 2:
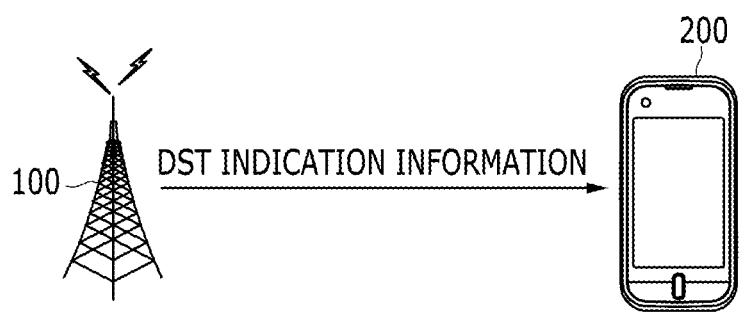
FIG. 2 is a diagram illustrating an example of a wireless communication system according to an exemplary embodiment of the present invention.

FIG. 2 is a diagram illustrating an example of a wireless communication system according to an exemplary embodiment of the present invention.

Referring to FIG. 2, the wireless communication system includes a base station 100 and a terminal 200.

The base station 100 communicates with the terminal 200 using a frame. The base station 100 determines the number of terminals connected to the base station 100, a connection state (e.g., an idle state and a sleep mode state) of each terminal, and a traffic load amount, determines whether discontinuous signal transmission (DST) is available through the collected information, and determines an entire DST allocation duration and a interval to which actual zero energy is allocated, if DST is available. The DST interval may be determined in a frame unit, a subframe unit, or a superframe unit.

Here, DST represents stop of transmission of a wireless signal for a predetermined time period through zero energy allocation at a interval in which transmission of a continuous wireless frame is continued. That is, DST represents that no signal is transmitted to a wireless interval through a carrier or a subcarrier. An entire DST duration represents an entire duration in which discontinuous transmission of a wireless signal is performed, and a DST interval represents a interval in which actual zero energy allocation is performed within the entire DST duration. The entire DST duration and the DST interval may be the same or different according to a designation range of zero energy allocation.

The base station 100 broadcasts DST indication information including information of the entire DST duration and the DST interval to the terminal 200.

The base station 100 intercepts power of a transmitting apparatus of a modulation apparatus and an RF apparatus for at least some interval of a DST interval within the entire DST duration and stops a wireless signal of a downlink, thereby reducing a power load of the transmitting apparatus and reducing signal interference between base stations. Particularly, the base station 100 intercepts power of a transmitting apparatus of a modulation apparatus and an RF apparatus for a interval, except for a downlink preamble interval and a system information transmission interval of the DST interval.

The base station 100 transmits DST indication information using a system information message having a long transmission cycle or using a downlink control channel having a very short cycle. A transmission cycle of the system information message may be longer than a cycle of a superframe.

When receiving DST indication information, the terminal 200 stops reception of an entire signal, except for a downlink preamble signal and a system information message at a DST interval within a scheduled entire DST duration. The terminal 200 receives a preamble signal and a system information message from a base station with a scheduled cycle.

Figure 3:
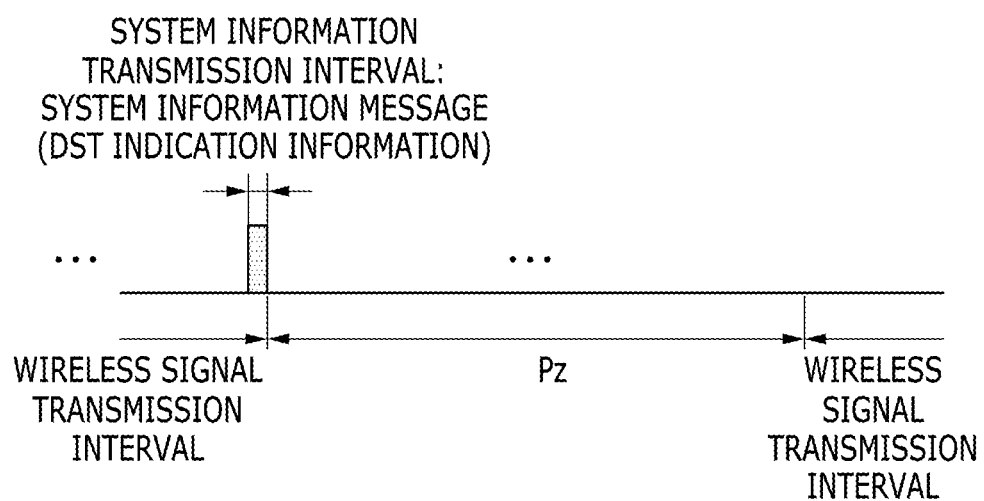
FIG. 3 is a diagram illustrating an example of a method of transmitting DST indication information in a base station according to an exemplary embodiment of the present invention.

FIG. 3 is a diagram illustrating an example of a method of transmitting DST indication information in a base station according to an exemplary embodiment of the present invention.

Referring to FIG. 3, the base station 100 transmits an entire wireless signal available in an entire frame and an entire subframe of a downlink at a wireless signal transmission interval.

If DST is available, the base station 100 broadcasts a system information message to all terminals including an already connected terminal or terminals to enter a network at a predetermined system information transmission interval. The base station 100 broadcasts DST indication information through a system information message. The system information message may be a control message of a MAC layer and a broadcasting signal of a downlink control channel.

The system information message includes DST indication information, and the DST indication information may include information of an entire DST duration Pz and a DST interval. The information of the entire DST duration Pz and the DST interval may be represented with a frame unit, a subframe unit, and a superframe unit. A start time point of the entire DST duration Pz may be set to a time point at which a system information transmission interval is terminated or a transmitting time point of a system information message.

The base station 100 broadcasts a system information message including DST indication information to a downlink, sets an entire DST duration Pz from a scheduled time point, and does not transmit a downlink control channel signal, a pilot signal, and data traffic, except for a downlink preamble signal and a system information message for a DST interval, within the entire DST duration Pz. That is, the base station 100 intercepts power of a modulation apparatus and an RF apparatus at the remaining intervals, except for a preamble interval and a system information transmission interval for a DST interval, thereby reducing power consumption of a transmitting apparatus.

When the entire DST duration Pz is terminated, the base station 100 can normally transmit all signals in an entire frame and an entire subframe of a downlink.

Figure 4:
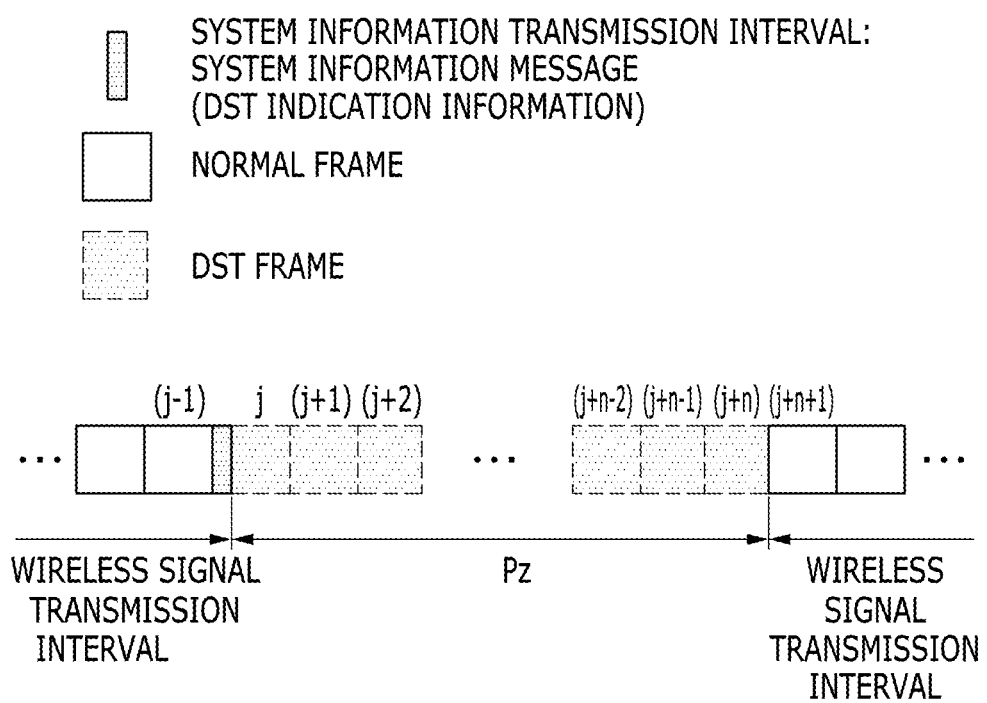
FIGS. 4 and 5 are diagrams illustrating an example of a DST interval according to an exemplary embodiment of the present invention.
Figure 5:
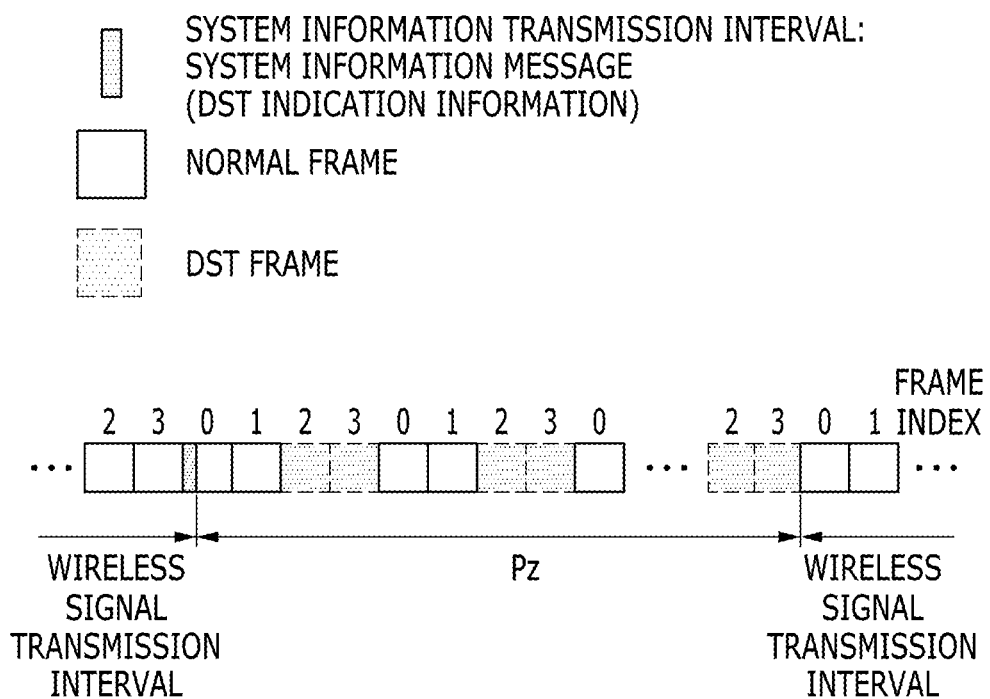

FIGS. 4 and 5 are diagrams illustrating an example of a DST interval according to an exemplary embodiment of the present invention.

As shown in FIG. 4, the entire DST duration Pz and the DST interval may be allocated in a superframe unit. The DST interval may include a continued DST frame to which zero energy is allocated. The entire DST duration Pz and the DST interval may be the same. In this case, information of the entire DST duration Pz and the DST interval may be represented with the number of frames.

The base station 100 transmits a system information message including DST indication information to the terminal 200. The DST indication information may include the number of DST frames.

The base station 100 does not transmit a downlink control channel signal, a pilot signal, and data traffic, except for a downlink preamble signal and a system information message, in an entire frame for an entire DST duration (or DST interval).

As shown in FIG. 5, the DST interval may be determined in a frame unit. Some frame of a plurality of frames within the entire DST duration Pz may be a DST frame to which zero energy is allocated. The DST interval includes a DST frame. For example, it is assumed that a superframe is formed with four frames, and in each superframe, the four frames have an index of 0, 1, 2, and 3, respectively. In this case, only a frame having an index of 2 and 3 may be determined to be a DST frame.

In this way, when some frame of a plurality of frames is a DST frame, an entire DST duration Pz may be represented with the number of frames, and information of the DST interval may be represented with a start location and the number of DST frames at one superframe within the entire DST duration Pz. Further, the information of the DST interval may be represented with bit map information representing a DST frame.

The base station 100 transmits a system information message including DST indication information to the terminal 200. The DST indication information may include the number of frames representing an entire DST duration Pz and information representing a DST interval.

The base station 100 transmits data traffic, a downlink control channel signal, and a pilot signal in a normal frame within an entire DST duration Pz, and does not transmit a downlink control channel signal, a pilot signal, and data traffic, except for a downlink preamble signal and a system information signal message, in a DST frame. Further, the system information signal message may be separately transmitted at a normal frame by avoiding a DST frame.

Figure 6:
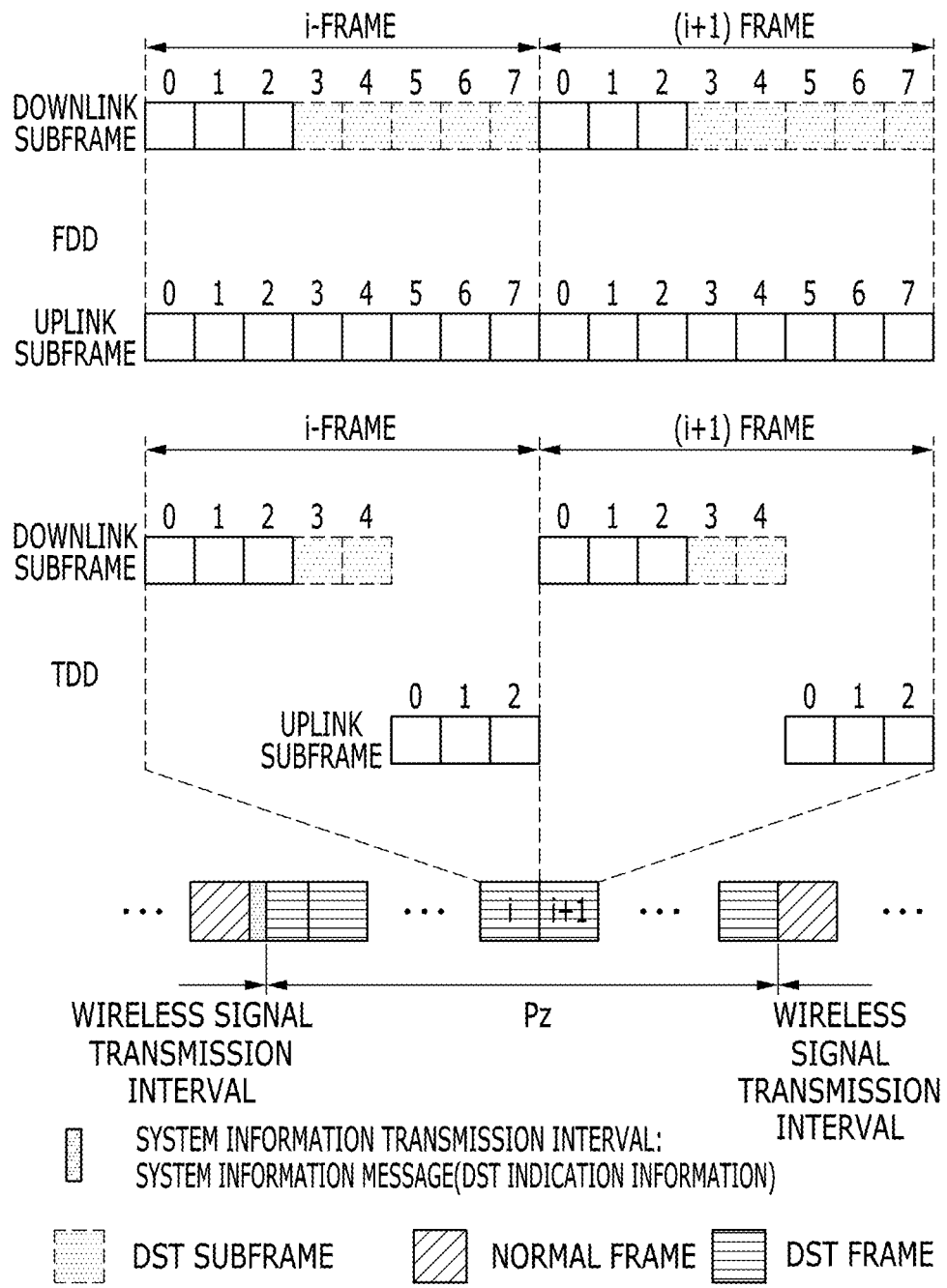
FIG. 6 is a diagram illustrating another example of a DST interval according to an exemplary embodiment of the present invention.

FIG. 6 is a diagram illustrating another example of a DST interval according to an exemplary embodiment of the present invention.

Referring to FIG. 6, the DST interval may be allocated in a subframe unit. That is, some subframe of a plurality of subframes forming each frame within the entire DST duration Pz may be a DST subframe to which zero energy is allocated. The DST frame represents a frame including a DST subframe. The DST interval includes a DST subframe.

For example, in a FDD method, it is assumed that one frame includes eight subframes, and the eight subframes have an index of 0, 1, 2, 3, 4, 5, 6, and 7, respectively. In this case, a downlink subframe having an index of 3, 4, 5, 6, or 7 may be determined as a DST subframe. Further, in a TDD method, it is assumed that one frame includes five downlink subframes and three uplink subframes, the five downlink subframes have an index of 0, 1, 2, 3, and 4, respectively, and the three uplink subframes have an index of 0, 1, and 2, respectively. In this case, subframe having an index of 3 and 4 of five downlink subframes may be determined as DST subframes.

In this way, when only some subframes of a plurality of subframes of a DST frame within the entire DST duration Pz are DST subframes, the entire DST duration Pz may be represented with the number of frames, and information of the DST interval may be represented with a start location and the number of DST subframes. Further, information of the DST interval may be represented with bit map information representing the DST subframe.

The base station 100 transmits a system information message including DST indication information to the terminal 200. The DST indication information may include the number of frames representing an entire DST duration Pz and information representing a DST interval.

The base station 100 transmits data traffic, a downlink control channel signal, and a pilot signal in a normal subframe within an entire DST duration Pz and does not transmit a downlink control channel signal, a pilot signal, and data traffic, except for a downlink preamble signal and a system information signal message, in a DST subframe. Further, the system information signal message may be separately transmitted at a normal frame by avoiding a DST frame.

Figure 7:
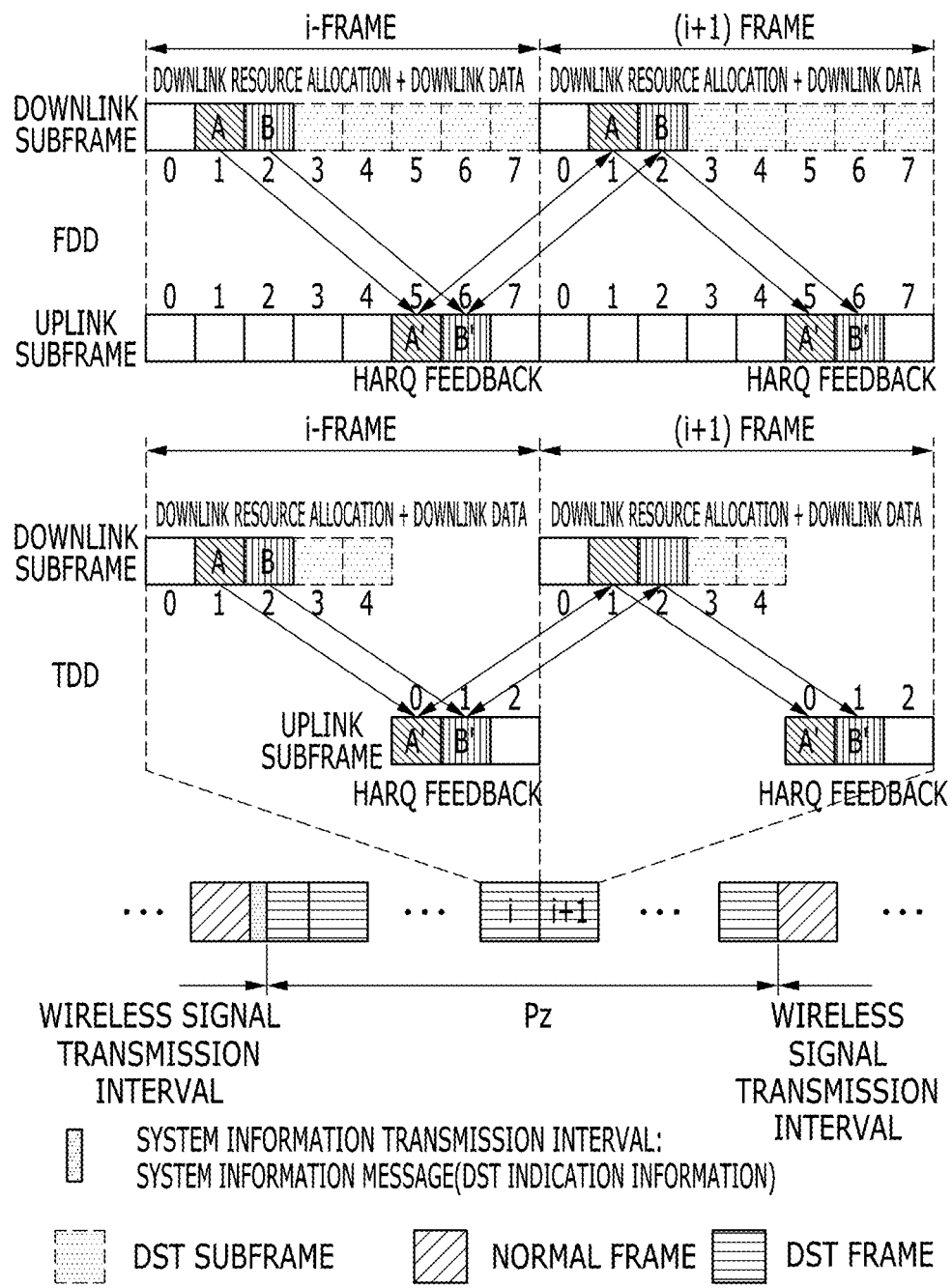
FIG. 7 is a diagram illustrating a method of controlling discontinuous signal transmission in a downlink HARQ method according to an exemplary embodiment of the present invention.
Figure 8:
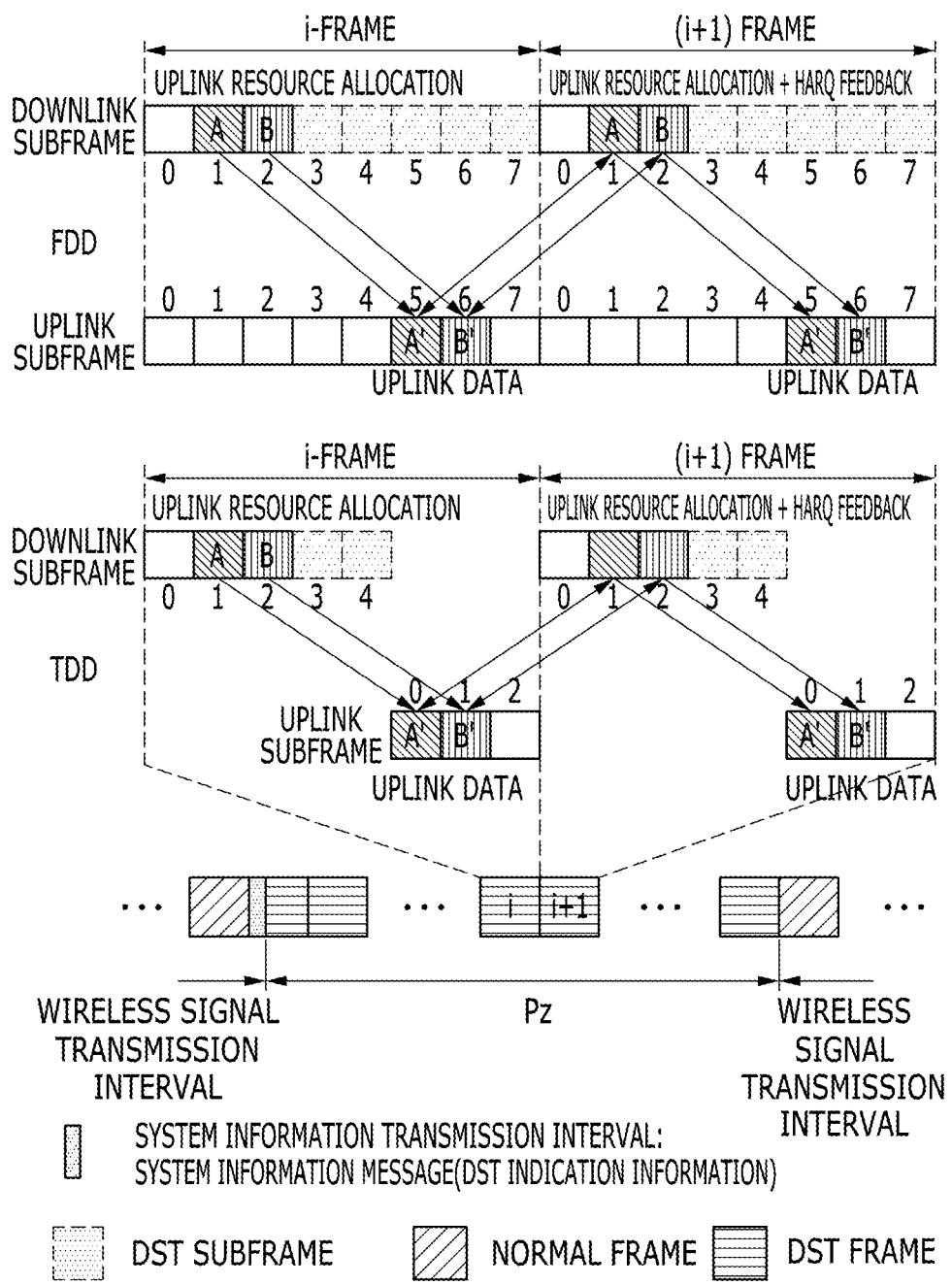
FIG. 8 is a diagram illustrating a method of controlling discontinuous signal transmission in an uplink HARQ method according to an exemplary embodiment of the present invention.

FIG. 7 is a diagram illustrating a method of controlling discontinuous signal transmission in a downlink HARQ method according to an exemplary embodiment of the present invention, and FIG. 8 is a diagram illustrating a method of controlling discontinuous signal transmission in an uplink HARQ method according to an exemplary embodiment of the present invention. FIGS. 7 and 8 illustrate only an i-th frame and an (i+1)th frame within an entire DST duration Pz. Further, in FIGS. 7 and 8, as shown in FIG. 6, it is assumed that in a FDD method, only a downlink subframe having an index of 3, 4, 5, 6 or 7 is a DST subframe, and in a TDD method, a downlink subframe having an index of 3 or 4 is a DST subframe.

Referring to FIG. 7, in an FDD mode, according to a downlink HARQ method, when a subframe index in which downlink resource allocation information is transmitted is 1, the base station 100 transmits downlink resource allocation information to the terminal 200 at an l-th subframe of an i-th frame. The downlink resource allocation information may be included in a downlink control channel signal such as advanced MAP (A-MAP).

Next, when a subframe index in which downlink resource allocation information is transmitted is m, the base station 100 transmits downlink data A and B like a sub-packet through an allocated downlink resource according to downlink resource allocation information in an m-th downlink subframe of an i-th frame.

In this case, l and m may be one of a downlink subframe having an index of 0, 1, or 2. That is, in a downlink subframe in which the DST subframe index is an index of 0, 1, or 2, not 3 or 4, a downlink control channel signal and downlink data are transmitted.

When the terminal 200 receives downlink data A and B, the terminal 200 transmits HARQ feedback A' and B' to the base station 100 through a determined uplink subframe of an i-th frame. The terminal 200 decodes the received downlink data, and if decoding is successful, the terminal 200 transmits ACK feedback corresponding to a positive response to the base station 100, and if decoding has failed, the terminal 200 transmits NACK feedback corresponding to a negative response to the base station 100.

The base station 100 operates at an (i+1)th frame like at an i-th frame. However, when the base station 100 receives NACK feedback from the terminal 200 at an i-th frame, the base station 100 retransmits downlink data A and B at l-th and m-th subframes of an (i+1)th frame.

Like in an FDD mode, in a TDD mode, the base station 100 transmits a downlink control channel signal and downlink data A and B in a downlink subframe having an index of 0, 1, or 2, not a DST subframe.

In this way, the base station 100 does not transmit a pilot signal, a downlink control channel signal, or downlink data in a DST subframe. However, when a downlink preamble interval and a system information interval exist within the DST subframe, at a downlink preamble interval and the system information interval, a downlink preamble and a system information message are transmitted. Further, a system information signal message may be separately transmitted in a normal frame by avoiding a DST frame.

Referring to FIG. 8, in an FDD mode, according to an uplink HARQ method, in a downlink subframe, when a subframe index in which uplink resource allocation information is transmitted is 1, the base station 100 transmits uplink resource allocation information to the terminal 200 at an l-th downlink subframe of an i-th frame. The uplink resource allocation information may be included in a downlink control channel signal. l may be one of downlink subframes having an index of 0, 1, and 2. The terminal 200 transmits uplink data such as a sub-packet through an allocated uplink resource according to uplink resource allocation information in an m-th uplink subframe of an i-th frame.

The base station 100 transmits HARQ feedback of previously received uplink data to the terminal 200 in an l-th downlink subframe of an (i+1)th frame. In this case, the base station 100 decodes a received uplink data burst, and if decoding is successful, the base station 100 transmits ACK feedback corresponding to a positive response to the terminal 200, and if decoding has failed, the base station 100 transmits NACK feedback corresponding to a negative response to the terminal 200. That is, in a downlink subframe having an index of 0, 1, or 2, not a DST subframe, a downlink control channel signal and HARQ feedback may be transmitted.

When the terminal 200 receives NACK feedback from the base station 100, the terminal 200 may retransmit uplink data in an m-th uplink subframe of an (i+1)th frame.

Further, like an FDD mode, in a TDD mode, the base station 100 may transmit HARQ feedback of a downlink control channel signal and uplink data in a downlink subframe having an index of 0, 1, or 2, not a DST subframe.

In this way, the base station 100 does not transmit HARQ feedback of a pilot signal, a downlink control channel signal, or uplink data in a DST subframe.

When an entire DST duration Pz is terminated, all signals of a downlink may be normally transmitted at each frame and subframe of the downlink.

Further, before the entire DST duration Pz is terminated, the base station 100 broadcasts DST duration termination indication information that terminates the entire DST duration Pz with a downlink control channel signal, and preliminarily terminates the entire DST duration Pz. In this way, when a resource is requested to an uplink and a downlink of the terminal 200 or when transmission of a wireless signal of the downlink is necessary by a request of an urgent call and handover, before the entire DST duration Pz is terminated, the entire DST duration Pz may be preliminarily terminated.

Figure 9:
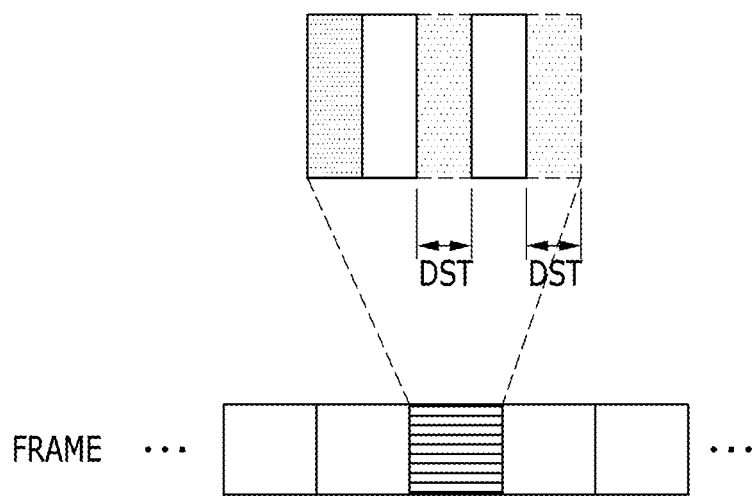
FIGS. 9 and 10 are diagrams illustrating another example of a method of transmitting DST indication information in a base station according to an exemplary embodiment of the present invention.
Figure 10:
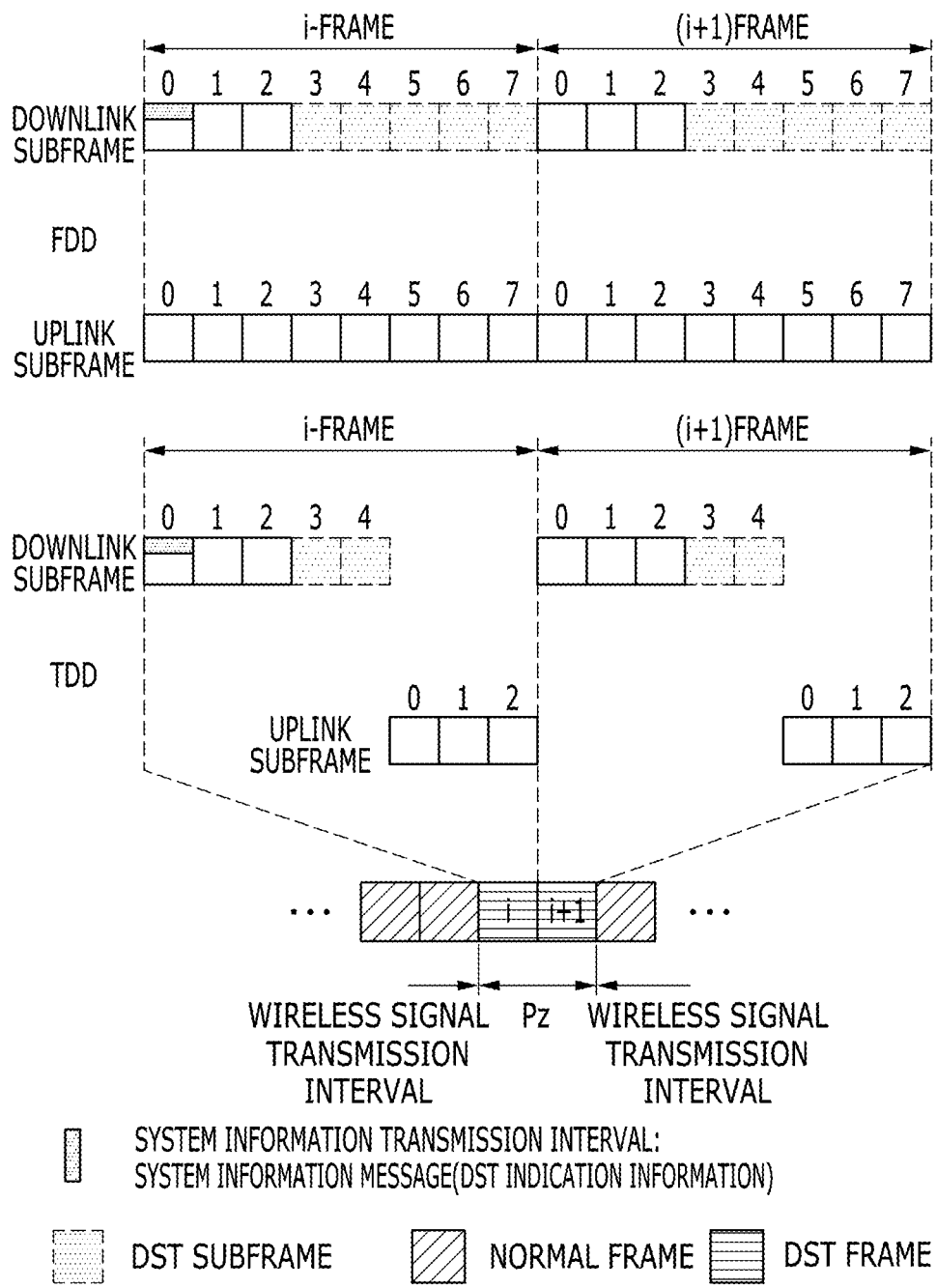

FIGS. 9 and 10 are diagrams illustrating another example of a method of transmitting DST indication information in a base station according to an exemplary embodiment of the present invention.

Referring to FIGS. 9 and 10, at a downlink control channel interval of each frame, the base station 100 broadcasts DST indication information through a downlink control channel signal. The DST indication information may include an entire DST duration, a location of a DST interval, and a size of a DST interval.

As shown in FIG. 9, in an individual frame, the DST indication information may include a downlink control channel interval, a signal transmission interval in which signal transmission is performed, and a DST interval. At the downlink control channel interval, DST indication information representing the DST interval may be transmitted.

When a DST interval is allocated in a frame unit by forming only one downlink subframe within a frame unit, in a downlink subframe within a frame, at least one non-continuous zero energy interval may be allocated, and DST indication information may include size and location information of a DST interval according to a size area of a radio resource corresponding to the number in which zero energy is allocated. A size of a DST interval may be represented with a resource index representing a length of an OFDM or OFDMA symbol, the number of subchannels, and a size of an allocated radio resource, and a location of a DST interval may be represented with a resource index indicating a location of OFDMA symbol offset or an allocation resource.

Further, as shown in FIG. 10, a frame includes a plurality of downlink subframes within a frame unit in an FDD method or a TDD method, and in this case, a size and a location of a DST interval may be represented by indicating an index of an entire downlink subframe to which DST is applied according to continuity of the DST interval, or size and location information of a DST interval may be represented with a start index of a downlink subframe in which a DST interval is started and the number of continued subframes. In this case, at a wireless interval, not a downlink subframe to which DST of a plurality of downlink subframes is applied, one normal subframe that performs a normal operation may include a downlink control channel interval. At the downlink control channel interval, DST indication information representing a DST interval may be transmitted.

For example, in an FDD method, a downlink subframe having an index of 3, 4, 5, 6, or 7 is a DST subframe, and in a TDD method, when a downlink subframe having an index of 3 or 4 is a DST subframe, a downlink subframe having an index of 0 among downlink subframes having an index of 0, 1, and 2 may be set to a downlink channel interval including DST indication information. In DST indication information, in an FDD method, a start subframe location of an entire DST duration sets a subframe index to 3, and a size or a length of a DST interval may be set to five subframe lengths. The base station 100 broadcasts a downlink control channel signal in every necessary frame and notifies the terminal 200 of DST indication information.

In a downlink subframe having an index of 0, 1, or 2, downlink and uplink resource allocation, downlink data transmission, and HARQ feedback of uplink data may be transmitted.

Unlike FIG. 10, in a random specific frame, a downlink control channel signal including DST indication information is transmitted, an entire DST duration may be designated to a plurality of frame lengths, and a DST subframe may be designated to frames within the interval.

The base station 100 broadcasts DST indication information using a downlink control channel signal of a specific frame or a subframe having a short transmission cycle, and stops transmission of a signal such as a downlink control channel signal, a pilot signal, and data traffic, except for a downlink preamble signal and a system information message for a DST interval, from a scheduled time point. Further, the system information signal message may be separately transmitted at a normal frame or a normal subframe by avoiding a DST subframe.

The terminal 200 may convert a state thereof to a temporary sleep state that stops reception of all signals, except for a downlink preamble signal and a system information message, for a DST interval.

Further, the base station 100 mixes a system information message and a downlink control channel signal having a long transmission cycle, and broadcasts DST indication information.

In an IEEE802.16.1 (IEEE802.16.m) WirelessMAN-Advanced specification-based wireless communication system, an always-on radio signal that continues transmission to a downlink in every superframe, every frame, or every subframe regardless of whether data traffic exists may include a common pilot, a preamble, and a midamble of a downlink control channel (DL control channels), a downlink control channel area, and a data burst area such as non-user specific A-MAP IE, which is one of superframe headers (SFHs), and assignment advanced-MAP IE (A-A-MAP IE). In an IEEE802.16e WirelessMAN-OFDMA specification-based wireless communication system, an always-on radio signal that continues transmission to a downlink may include DL control channels such as a frame control header (FCH), which is a downlink frame prefix, and DL-MAP IE, which is a MAP message, and a common pilot of a downlink control channel area and a data burst area, as well as a preamble. A downlink control channel and pilot of the signals may correspond to a target signal of DST.

Table 1 represents SP1 IE, which is a subpacket of a secondary superframe header (hereinafter, SFH) of an SFH information element (IE), which is a system information message, and DST indication information of a superframe unit may be transmitted through SP1 IE.

TABLE 1

| Syntax | Size (bit) | Notes |
| --- | --- | --- |
| S-SFH SP1 IE format ( ) { | | |
| DST indicator | 1 | Indicates that ABS operates DL continuous or discontinuous signal transmission operation mode of always-on radio signals, such as DL control channels and pilots except for SFHs, preambles, and midamble, to perform interference mitigation and transmission power saving.<br>0b0: DL continuous signal transmission mode<br>0b1: DL discontinuous signal transmission mode<br>If Discontinuous signal transmission indicator is 0b1, the ABS doesn't transmit the DL control channels and pilots except for SFHs, preambles, and midamble, starting from a Start frame index to the last frame within this current superframe period. Also, the ABS shall not modulate the pilots and DL control channel information elements and the AMS shall discard DL control channels and pilots except for SFHs, preambles, and midamble in the interval of discontinuous operation.<br>Otherwise, the ABS shall continuously and normally transmit all the signals (DL control information channels and pilots, SFHs, preambles, and midamble) even if almost all the frames and AAI subframes are blank in DL. |
| if (Discontinuous signal transmission indicator == 0b1) { | | Indicates that the ABS operate DL discontinuous signal transmission mode of some always-on radio signals in applicable frame length when Discontinuous signal transmission indicator is 0b1. |
| Start frame index | 2 | Indicates the absolute frame index in which the ABS starts DL discontinuous signal transmission operation until the last frame.<br>0b00: 1st frame in a superframe<br>0b01: 2nd frame in a superframe<br>0b10: 3rd frame in a superframe<br>0b11: 4th frame in a superframe<br>If Start frame index is 0b00, all the signals in the first DL AAI subframe including SFH shall be not applied to DL discontinuous signal transmission operation. |

In Table 1, a DST indicator is an indicator representing whether to continuously or discontinuously transmit a signal.

When the DST indicator represents a DST mode, the base station 100 does not transmit a downlink control channel and pilot signals, except for a superframe header and a preamble signal, from a designated start frame index to a last frame within a present superframe period to a downlink. In this case, a midamble signal may be transmitted to a downlink or may not be transmitted to a downlink.

A start frame index represents a specific frame index in which a DST mode starts, and a DST mode advances to a final frame. Further, a frame bit map to which a DST mode is applied instead of a start frame index may be applied, and in this case, a frame bit map may indicate the frame number within one superframe, and the indicated frame does not transmit a downlink control channel and pilot signals, except for a superframe header and a preamble, to the downlink. As described above, the indicated frame may transmit a midamble signal or may not transmit a midamble signal.

Further, the base station 100 does not modulate a downlink control channel IE and pilot signals. The terminal 200 stops reception of a signal, except for a superframe header and a preamble signal, within a DST interval.

When the DST indicator represents a downlink continuous signal transmission mode, even when almost all frames or subframes of the downlink are in an empty state, the base station 100 normally and continuously transmits all signals such as a downlink control channel, a pilot, a superframe header, a preamble, and a midamble to a downlink.

Table 2 represents broadcasting signal allocation A-MAP IE of a downlink control channel signal, and DST indication information may be transmitted through broadcasting signal allocation A-MAP IE.

TABLE 2

| Syntax | Size (bit) | Notes |
| --- | --- | --- |
| Broadcast_Assignment_A-MAP_IE( ) { | | |
| A-MAP IE Type | 4 | Broadcast Assignment A-MAP IE |
| Function Index | 2 | 0b11: This IE carries extended function information |

TABLE 2-continued

| Syntax | Size (bit) | Notes |
|---|---|---|
| if {Function Index == 0b11} { | | Extended function information |
| DST indicator | 1 | Indicates that ABS operates DL continuous or discontinuous signal transmission operation mode of always-on radio signals, such as DL control channels and pilots except for SFHs, preambles, and midamble, to perform interference mitigation and transmission power saving.<br>0b0: DL continuous signal transmission mode<br>0b1: DL discontinuous signal transmission mode<br>If Discontinuous signal transmission indicator is 0b1, the ABS doesn't transmit the DL control channels and pilots except for SFHs, preambles, and midamble, starting from specific DL AAI subframe index to the last DL AAI subframe within this current frame period. Also, the ABS shall not modulate the pilots and DL control channel information elements and the AMS shall discard DL control channels and pilots except for preambles and midamble in the interval of discontinuous operation. Otherwise, the ABS shall continuously and normally transmit all the signals (DL control information channels and pilots, preambles, and midamble) even if almost all the AAI subframes are blank in DL. |
| if (Discontinuous signal transmission indicator == 0b1) { | | Indicates that the ABS operates DL discontinuous signal transmission mode of some always-on radio signals in applicable subframe length when Discontinuous signal transmission indicator is 0b1. |
| Start subframe index | 3 | Indicates the absolute DL AAI subframe index in which the ABS starts DL discontinuous signal transmission operation until the last DL AAI subframe.<br>0b000: 2nd AAI subframe in a frame<br>0b001: 3rd AAI subframe in a frame<br>0b010: 4th AAI subframe in a frame<br>0b011: 5th AAI subframe in a frame<br>0b100: 6th AAI subframe in a frame<br>0b101: 7th AAI subframe in a frame<br>0b110: 8th AAI subframe in a frame<br>0b111: Reserved<br>0b101 and 0b110 are only applicable for FDD mode. |
| } | | |
| } | | |

When a DST indicator represents a DST mode, the base station 100 does not transmit a downlink control channel and pilot signals, except for a preamble, from a designated start subframe index within a present frame period to a final subframe to the downlink. In this case, a midamble signal may be transmitted or may not be transmitted.

A start frame index represents a specific subframe index in which a DST mode is started, and a DST mode advances to a final subframe. Further, a subframe bit map to which a DST mode is applied instead of a start subframe index may be applied, and in this case, a subframe bit map may indicate the downlink subframe number within one superframe, and the indicated subframe does not transmit a downlink control channel and pilot signals, except for a preamble signal, to the downlink. As described above, the indicated subframe may transmit a midamble signal or may not transmit a midamble signal.

Further, the base station 100 may not modulate a downlink control channel signal and pilot signals at a DST interval that does not transmit to a downlink. The terminal 200 may stop reception of all signals, except for a preamble signal, within a DST interval. Because a subframe to which DST is applied should be allocated to a subframe after at least a first subframe, a subframe to which SFH is transmitted is excluded from a DST subframe subject.

When a DST indicator represents a downlink continuous signal transmission mode indicating a normal frame or a normal subframe, even when almost all subframes of the downlink are in an empty state, the base station 100 normally and continuously transmits signals such as a downlink control channel, a pilot, a superframe header, a preamble, and a midamble to the downlink.

Figure 11:
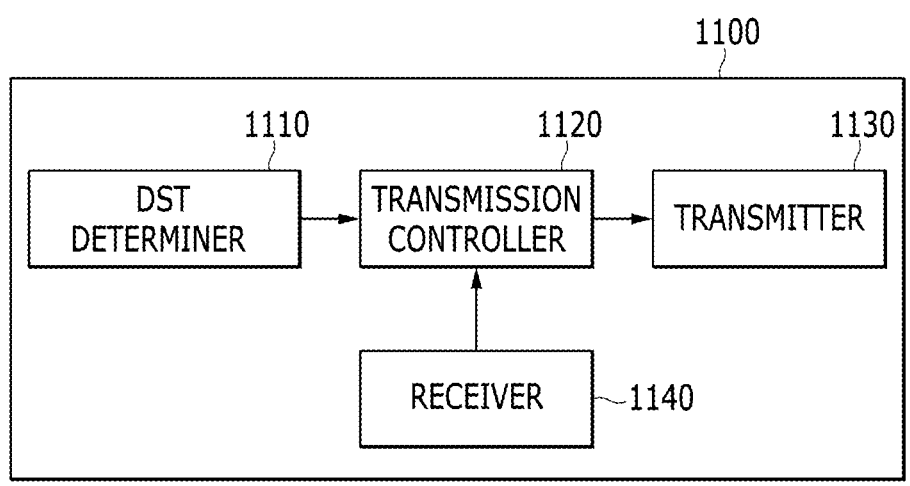
FIG. 11 is a diagram illustrating a signal transmission control apparatus according to an exemplary embodiment of the present invention.

FIG. 11 is a diagram illustrating a signal transmission control apparatus according to an exemplary embodiment of the present invention.

Referring to FIG. 11, a signal transmission control apparatus 1100 includes a DST determiner 1110, a transmission controller 1120, and a transmitter 1130. Further, the signal transmission control apparatus 1100 may include a receiver 1140. The signal transmission control apparatus 1100 may be embodied within the base station 100.

The DST determiner 1110 determines the number of terminals having connected to the base station 100, a connection state (e.g., an idle state and a sleep mode state) of a terminal, and a traffic load amount, and determines whether DST is available through the collected information. The DST determiner 1110 determines an entire DST duration and a DST interval, if DST is available.

The transmission controller 1120 sets an entire DST duration and a DST interval and controls signal transmission within the DST interval. The transmission controller 1120 intercepts power of a transmitting apparatus at a interval, except for a downlink preamble interval and a system information transmission interval in the DST interval, and thus stops transmission of all remaining signals, except for a downlink preamble signal and a system information message, at the DST interval.

The transmitter 1130 broadcasts information of an entire DST duration and a DST interval to the terminal 200. The information of the entire DST duration and the DST interval may be transmitted through a system information message or a downlink control channel signal.

The receiver 1140 determines whether DST is available and receives information necessary for determining an entire DST duration and a DST interval from the terminal 200. Further, when another apparatus determines an entire DST duration and a DST interval, the receiver 1140 receives information of an entire DST duration and a DST interval corresponding to the base station 100.

Figure 12:
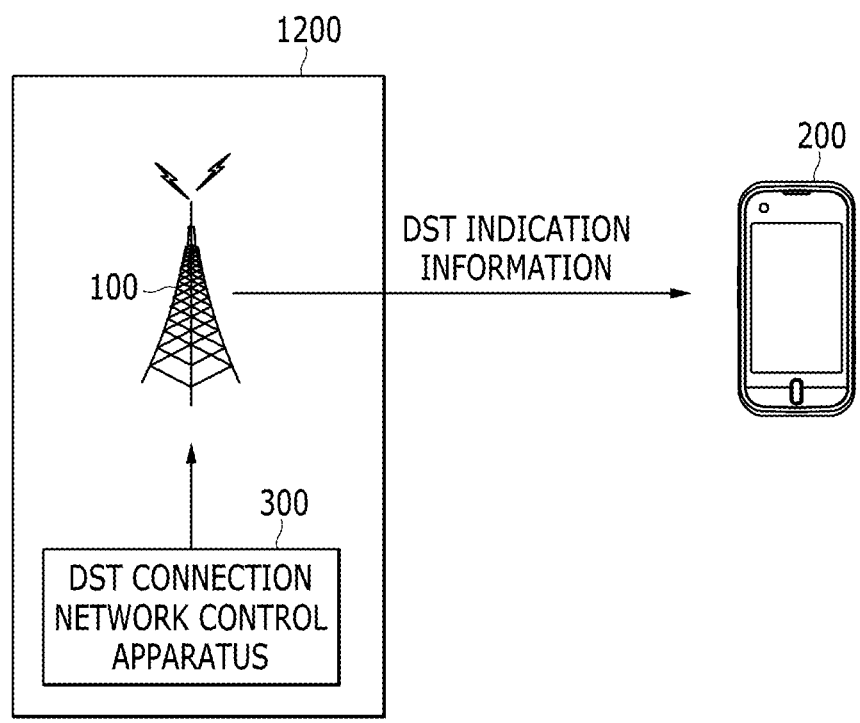
FIG. 12 is a diagram illustrating another example of a signal transmission control apparatus according to an exemplary embodiment of the present invention.

FIG. 12 is a diagram illustrating another example of a signal transmission control apparatus according to an exemplary embodiment of the present invention.

Referring to FIG. 12, a signal transmission control apparatus 1200 may further include a base station 100 and a DST connection network control apparatus 300.

The DST connection network control apparatus 300 is a control apparatus for scheduling DST by cooperation between base stations. The DST connection network control apparatus 300 may be mounted in a central base station, and may be mounted in a network apparatus such as a gateway or may be independently formed.

The DST connection network control apparatus 300 determines the number of terminals having connected to each base station, a connection state (e.g., an idle state and a sleep mode state) of a terminal, and a traffic load amount through signal matching with a plurality of base stations of the wireless communication system. For convenience, FIG. 12 illustrates only one base station. Further, the DST connection network control apparatus 300 collects a type of a base station and location information of each base station such as a neighboring base station or an overlapped base station between base stations.

The DST connection network control apparatus 300 determines whether each base station is in a state in which DST is available through the collected information, and determines DST indication information such as an entire DST duration of each base station, a size of a DST interval, and a location of a DST interval in order to reduce signal interference between a base station in which DST is available and a base station in which DST is unavailable and to reduce transmission power of an unnecessary wireless signal.

In this way, when the DST connection network control apparatus 300 determines DST indication information, the base station 100 includes a transmission controller 1120, a transmitter 1130, and a receiver 1140.

When the terminal 200 receives DST indication information, the terminal 200 stops reception of all signals, except for a downlink preamble signal and a system information message of a DST interval, within a scheduled entire DST duration.

Figure 13:
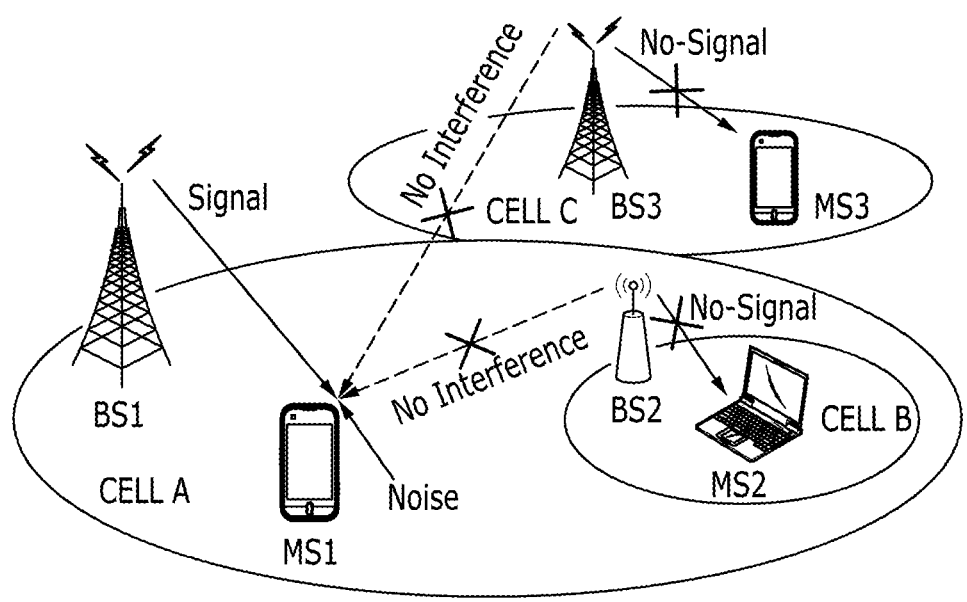
FIG. 13 is a diagram illustrating an interference influence with a neighboring base station through a signal transmission control according to an exemplary embodiment of the present invention.

FIG. 13 is a diagram illustrating an interference influence with a neighboring base station through signal transmission control according to an exemplary embodiment of the present invention.

As shown in FIG. 13, it is assumed that that a cell A and a cell B are overlapped, and a cell C is adjacent to the cell B.

When base stations BS2 and BS3 of the cell B and the cell C stop transmission of all signals, except for a downlink preamble signal and a system information message, to terminals MS2 and MS3 for a DST interval, a terminal MS1 that receives a signal that is transmitted from a base station BS1 of the cell A can avoid signal interference that may occur in the base station BS2 of the cell B and the base station BS3 of the cell C for the DST interval. In this way, for a DST interval, an influence of signal interference between cells of neighboring base stations BS2 and BS3 can be reduced.

According to an exemplary embodiment of the present invention, at a wireless signal transmission interval of a downlink, by stopping modulation and transmission of a wireless signal for a predetermined time, a wireless transmitting apparatus saves power consumption such as through a load decrease, thereby enhancing energy efficiency of a network, and a wireless receiving apparatus can perform temporary sleep that stops a receiving operation for a predetermined time, thereby reducing power consumption. That is, an effect of enhancing energy efficiency of the transmitting side and the receiving side of the wireless communication system can be provided.

Further, when data to transmit does not exist, for a predetermined time in which transmission of a wireless signal is stopped, an effect that reduces an influence of signal interference between cells of a neighboring base station is provided.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling signal transmission in a base station comprising a transmitter configured to transmit signal frames, the method comprising:
   broadcasting information of an entire discontinuous signal transmission duration and information of a discontinuous signal transmission interval to all terminals in a cell; and
   stopping transmission of a downlink control signal, a pilot signal, and data traffic except for a preamble signal and a system information message for the discontinuous signal transmission interval to the terminals in the cell, wherein the terminals in the cell do not perform any receiving operations except for the preamble signal and the system information message during the discontinuous signal transmission interval.

2. The method of claim 1, wherein the broadcasting of information comprises broadcasting a system information message comprising the information of the entire discontinuous signal transmission and the information of the discontinuous signal transmission interval, and the system information message is transmitted with a cycle longer than a superframe cycle.

3. The method of claim 1, wherein the broadcasting of information comprises broadcasting a downlink control channel signal comprising the information of the entire discontinuous signal transmission duration and the information of the discontinuous signal transmission interval, and the downlink control channel signal is transmitted in every transmitted signal frame.

4. The method of claim 3, wherein the frame comprises a plurality of downlink subframes, and
the downlink control channel signal is transmitted at a downlink subframe that is not included in the discontinuous signal transmission interval among the plurality of downlink subframes.

5. The method of claim 1, further comprising transmitting a preamble signal at a downlink preamble interval of the discontinuous signal transmission interval.

6. The method of claim 1, further comprising transmitting a system information message at a system information transmission interval of the discontinuous signal transmission interval.

7. The method of claim 1, further comprising receiving information of an entire discontinuous signal transmission duration and information of a discontinuous signal transmission interval from a discontinuous signal transmission connection network control apparatus.

8. The method of claim 1, wherein the stopping of transmission comprises intercepting power of a transmitting apparatus.

9. A signal transmission control apparatus of a base station, comprising:
a transmitter configured to transmit signal frames, and further configured to broadcast information of an entire discontinuous signal transmission duration and information of a discontinuous signal transmission interval to which zero energy is allocated to all terminals in a cell; and
a transmission controller configured to stop signal transmission of a downlink control signal, a pilot signal, and data traffic, except for a downlink preamble interval and a system information transmission interval of the discontinuous signal transmission interval to the terminals in the cell,
wherein the terminals in the cell do not perform any receiving operations except for the preamble signal and the system information message during the discontinuous signal transmission interval.

10. The signal transmission control apparatus of claim 9, wherein the transmitter is further configured to transmit a system information message that is transmitted with a cycle longer than a superframe cycle, and
the system information message comprises information of the entire discontinuous signal transmission duration and information of the discontinuous signal transmission interval.

11. The signal transmission control apparatus of claim 9, wherein the transmitter is further configured to transmit a downlink control channel signal in every transmitted signal frame, and
wherein the downlink control channel signal comprises information of the entire discontinuous signal transmission duration and information of the discontinuous signal transmission interval.

12. The signal transmission control apparatus of claim 11, wherein the downlink control channel signal is transmitted at an interval that is not set as the discontinuous signal transmission interval in the frame.

13. The signal transmission control apparatus of claim 9, further comprising a receiver configured to receive information of the entire discontinuous signal transmission duration and information of the discontinuous signal transmission interval from a discontinuous signal transmission connection network control apparatus.

14. A method of controlling signal transmission in a base station comprising a transmitter transmitting signal frames, the method comprising:
broadcasting information of a discontinuous signal transmission duration including a discontinuous signal transmission interval to all terminals in a cell; and
not transmitting 1) a downlink control signal, a pilot signal, and data traffic, 2) the downlink control signal, a pilot signal, and data traffic except for a preamble signal for synchronization, or 3) the downlink control signal, a pilot signal, and data traffic except for the preamble signal and a system information message, to the terminal during the discontinuous signal transmission interval to the all terminals in the cell,
wherein the terminals in the cell do not perform any receiving operations except for the preamble signal and the system information message during the discontinuous signal transmission interval.

15. The method of claim 14, wherein the discontinuous signal transmission duration includes a normal frame or subframe for transmitting the downlink control signal or the data and the discontinuous signal transmission interval.

16. The method of claim 15, wherein, during the discontinuous signal transmission interval, 1) no downlink control signal, 2) the preamble signal for synchronization, or 3) the preamble signal and a system information message are transmitted to the terminal.

17. The method of claim 14, wherein the terminal is set to stop receiving the downlink control signal and the data during the discontinuous signal transmission interval.

* * * * *